United States Patent [19]

Sutter, Jr. et al.

[11] Patent Number: 4,859,075

[45] Date of Patent: Aug. 22, 1989

[54] LASER THERMAL TESTING METHOD AND SYSTEM FOR USE WITH A FIRE ALARM SYSTEM

[75] Inventors: Leroy V. Sutter, Jr., Irvine, Calif.; Robert E. Mofley, Eagle River, Ak.

[73] Assignees: Directed Energy, Inc., Calif.; Atlantic Richfield Company, Del.

[21] Appl. No.: 167,651

[22] Filed: Mar. 14, 1988

[51] Int. Cl.$^4$ .............................................. G01K 15/00

[52] U.S. Cl. .............................................. 374/2; 374/205; 374/121; 374/130; 374/132; 356/138; 340/515; 340/557; 340/589; 219/121.61; 219/121.77; 219/121.76; 219/121.83

[58] Field of Search .................... 219/121.83, 121.76, 219/121.77, 121.61, ; 374/2, 205, 121, 130, 132; 356/138; 128/303.1, 395; 340/514, 515, 557, 588, 589

[56] References Cited

U.S. PATENT DOCUMENTS

| | | | |
|---|---|---|---|
| 3,802,249 | 4/1974 | Clawson | 374/2 |
| 4,325,145 | 4/1982 | Corbett et al. | 340/589 |
| 4,396,285 | 8/1983 | Presta et al. | 356/138 |
| 4,459,986 | 7/1984 | Karaki | 128/303.1 |
| 4,675,501 | 6/1987 | Klingel | 219/121.67 |
| 4,785,456 | 11/1988 | Kaplan | 372/38 |

FOREIGN PATENT DOCUMENTS 2108282A 5/1983 United Kingdom .

*Primary Examiner*—William A. Cuchlinski, Jr.
*Assistant Examiner*—Diego F. F. Gutierrez
*Attorney, Agent, or Firm*—W. Edward Johansen

[57] ABSTRACT

A laser thermal testing method and system for use in testing a fire alarm system which has a plurality of heat-sensors which are remotely distributed throughout a protected area. The laser thermal testing system includes a first laser and a second laser. The first laser generates an aiming beam of coherent electromagnetic radiation in the visible spectrum. The laser thermal testing system also includes a movable reflector which reflects the aiming beam. The movable reflector is optically coupled to the first laser. The movable reflector is first moved in order to align the aiming beam in an aligned position so that the aiming beam is reflected onto one of the heat-sensors. The movable reflector is then fixedly secured in the aligned position. The second laser generates a heating beam of coherent electromagnetic radiation in the infrared spectrum. The second laser is optically coupled to the reflector so that when the movable reflector is fixedly secured in the aligned position the second laser may be turned on in order for the heating beam to be reflected onto the heat-sensor thereby triggering the fire alarm system during a testing sequence.

1 Claim, 1 Drawing Sheet

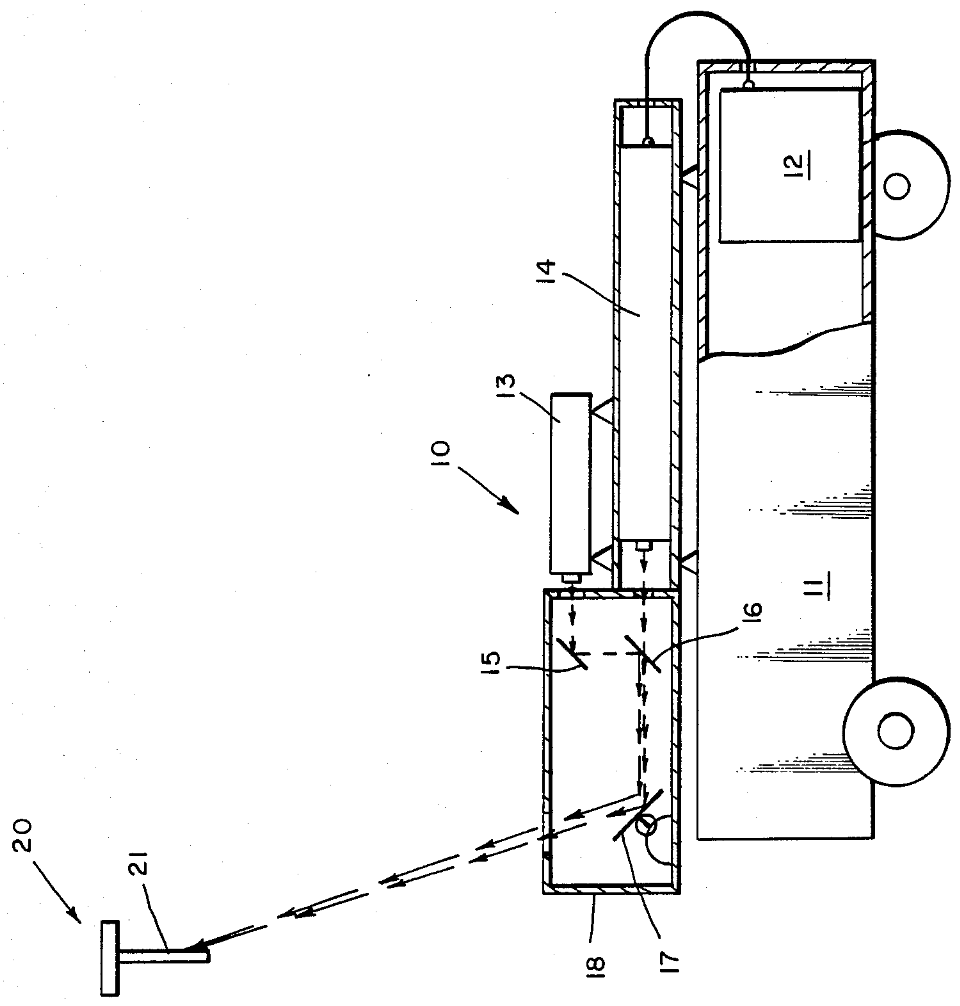
10
11
12
13
14
15
16
17
18
20
21

LASER THERMAL TESTING METHOD AND SYSTEM FOR USE WITH A FIRE ALARM SYSTEM

BACKGROUND OF THE INVENTION

1. Field of the Inventions

The present invention relates to a testing method and system for use with a fire alarm system and more particularly to a laser thermal testing method and system which is used in testing a fire alarm system with a plurality of remotely distributed heat-sensors.

2. Description of the Prior Art

U.S. Pat. No. 4,428,434, entitled Automatic Fire Protection System, issued to Jonathon L. Gelaude on Jan. 31, 1984, teaches an automatic fire protection system which protects a building from fire damage and which includes automatic temperature sensors to monitor the temperature of several places on the building. The automatic fire protection system also includes sensor amplifiers for amplifying the signal from the temperature sensors and an anticipating function for turning on the automatic fire protection system in response to a predetermined temperature or a sudden rise in temperature.

U.S. Pat. No. 4,641,127, entitled Security and Fire Protection System, issued to Dennis R. Hogan and John K. Wright on Feb. 3, 1987, teaches a fire protection system which includes a plurality of heat-sensors. The heat-sensors are mounted at various positions throughout a premises to be protected.

U.S. Pat. No. 4,550,311, entitled Remote Sensing Systems, issued to John L. Galloway, Timothy R. Hankins and Ian A. Owers on Oct. 29, 1985, teaches a fire protection system which is for installation at one site and which has a plurality of remote heat-sensors. The heat-sensor detect fire and transmit corresponding signals by radio to a master station.

U.S. Pat. No. 3,802,249, entitled Method and Apparatus for Checking Fire Detectors, issued to G. Clawson on Apr. 9, 1974, teaches a fire detector checking method and device which nondestructively verify the operation of installed fire detectors of the type which operate on the principle of detecting the rate of temperature rise of the ambient air to sound an alarm and/or which sound an alarm when the temperature of the ambient air reaches a preset level. The fire alarm checker device uses the principle of effecting a controlled simulated alarm condition to ascertain whether or not the detector will respond. The checker includes a hand-held instrument employing a controlled heat source, such as an electric lamp has a variable input, for heating at a controlled rate an enclosed mass of air in a first compartment. The air mass is then disposed about the fire detector to be checked. A second compartment of the device houses an electronic circuit to sense and adjust the temperature level and heating rate of the heat source. Actuation of a fire detector of the rate of rise type within a predetermined time interval after applying the heated air mass thereto verifies the soundness of the system.

U.S. Pat. No. 4,271,693, entitled Device for Testing Smoke Detector Alarms, issued to Donald R. Bute on June 9, 1981, teaches a device for testing smoke detector alarms which includes a base housing. An extendable telescopic assembly which includes three tubes, with the top tube having a combustible pellet mounted at its upper end is mounted on the base housing. The pellet is composed of a substance that smolders upon heating rather than flaming or exploding. The base housing contains electrical batteries wired in circuit with a heating element which is mounted adjacent to the combustible pellet so that a switch can be operated to heat the heating element and cause the pellet to smolder so that smoke emerges from the pellet. The testing device can be placed in the extended position and the pellet held near a smoke detector and burned to ascertain whether the smoke detector alarm is functioning properly. After use the testing device can be placed in a compact storage position by sliding the extendable telescopic tubes so that they fit within each other.

U.S. Pat. No. 4,618,961, entitled Configuration of Electrodes for Transversely Excited Gas Lasers, issued to Leroy V. Sutter, Jr. on Oct. 21, 1986, teaches a transversely excited gas laser which includes an elongated cylindrical chamber with a laser gas confined therein, a pair of reflectors which reflect light energy from a discharge of the laser gas within the chamber so that the light energy travels longitudinally the length thereof, an rf generator which applies a voltage of alternating polarity between the electrodes at a frequency ranging from 10 Mhz to about 3 Ghz to establish the laser gas discharge, a coupling circuit which matches the steady state reactive impedance of the chamber to the impedance of the rf generator and couples the rf generator to the electrodes.

U.S. Pat. No. 4,396,285, entitled Laser System and its Method of Use, issued to John A. Gibson, Charles R. Munnerlyn and Peter S. Presta on Aug. 2, 1983, teaches a laser system for medical applications has at least two lasers and a movable concave reflector. The lasers are capable of generating beams of coherent electromagnetic radiation. One of the beams, an aiming beam, is aligned to impinge the reflector, to reflect therefrom and to impinge a biological specimen. The reflector is moved until the beam is aligned to impinge the desired position. The reflector is held stationary and the second beam is generated. The second beam is also aligned to impinge the reflector to reflect therefrom and to impinge the same desired position as that impinged by the first beam.

SUMMARY OF THE INVENTION

In view of the foregoing factors and conditions characteristic of the prior art it is the primary object of the present invention to provide to a laser thermal testing method and system which is used in testing a fire alarm system with a plurality of remotely distributed heat-sensors.

In accordance with an embodiment of the present invention a laser thermal testing method and system is described. The laser thermal testing system is used in testing a fire alarm system which has a plurality of heat-sensors which are remotely distributed throughout a protected area. The laser thermal testing system includes a first laser and a second laser. The first laser generates an aiming beam of coherent electromagnetic radiation in the visible spectrum. The laser thermal testing system also includes a movable reflector which reflects the aiming beam. The movable reflector is optically coupled to the first laser. The movable reflector is first moved in order to align the aiming beam in an aligned position so that the aiming beam is reflected onto one of the heat-sensors. The movable reflector is then fixedly secured in the aligned position. The second laser generates a heating beam of coherent electromagnetic radiation in the infrared spectrum. The second laser is optically coupled to the reflector so that when the movable reflector is fixedly secured in the aligned position the second laser may be turned on in order for the heating beam to be reflected onto the heat-sensor thereby triggering the fire alarm system during a testing sequence.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

The drawing is a side elevation in partial cross-section of a laser thermal testing system which is used in testing a fire alarm system with a plurality of remotely distributed heat-sensors and which has been constructed in accordance with the principles of the present invention.

DESCRIPTION OF THE PREFERRED EMBODIMENT

In order to best understand the present invention it is necessary to refer to the following description of its preferred embodiment conjunction with the accompanying drawing. Referring to the drawing a laser thermal testing system 10 includes a housing 11 which may be a cart that is disposed on a set of wheels and a power supply 12 which is disposed within the housing 12. The laser thermal testing system 10 also includes a first laser 13 and a second laser 14. The first laser 13 generates an aiming beam of coherent electromagnetic radiation in the visible spectrum. The second laser 14 generates a heating beam of coherent electromagnetic radiation in the infrared spectrum. The laser thermal testing system 10 further includes a beam combiner and steering mechanism having fixed reflector 15, a fixed tranmissive-reflector 16 and a movable reflector 17 all of which are disposed within a casing 18. The movable reflector 17 is optically coupled to the transmissive-reflector 16. The fixed reflector 15 reflects the aiming beam from the first laser 13 to the transmissive reflector 16. The transmissive-reflector 16 transmits the heating beam from the second laser and the aiming beam from the fixed reflector 15 to the movable reflector 17. The beam combiner and steering mechanism also employ an optical fiber to bring the visible aiming beam to the dichroic optical surface of the transmissive-reflector 16.

A fire alarm system 20 has a plurality of heat-sensors 21 which are remotely distributed throughout a protected area. The movable reflector 17 is first moved in order to align the aiming beam in an aligned position so that the aiming beam is reflected onto one of the heat-sensors 21. The movable reflector is then fixedly secured in the aligned position. When the movable reflector 17 is fixedly secured in the aligned position the second laser 14 may be turned on in order for the heating beam to be reflected onto the heat-sensor 21 thereby triggering the fire alarm system 20 during a testing sequence.

From the foregoing it can be seen that a laser thermal testing method and system for a fire alarm system has been described. It should be noted that the sketches are not drawn to scale and that distance of and between the figures are not to be considered significant.

Accordingly it is intended that the foregoing disclosure and showing made in the drawing shall be considered only as an illustration of the principle of the present invention.

What is claimed is:

1. A laser thermal testing method for use in testing a fire alarm system having a plurality of heat sensors each of which is remotely distributed, utilizing a laser thermal testing system comprising:

a. a first laser which generates an aiming beam of coherent electromagnetic radiation in the visible spectrum;

b. reflecting means for reflecting said aiming beam, said reflecting means being optically coupled to said first laser so that said reflecting means first may be moved to align said aiming beam in a aligned position in order for said aiming beam to be reflected onto one of the heat sensors and then may be fixedly secured in said aligned position;

c. a second laser which generates a heating beam of coherent electromagnetic radiation in the infrared spectrum and which is optically coupled to said reflecting means whereby when said reflecting means is fixedly secured in said aligned position said second laser may be turned on so that said heating beam is reflected onto said one of the heat sensors thereby triggering the fire alarm system during a testing sequence; and d. transporting means for transporting said first and second lasers and said reflecting means from a first position to a second position, said laser thermal testing method comprising:

generating an aiming beam of coherent electromagnetic radiation in the visible spectrum with said first laser, reflecting said aiming beam with said reflecting means onto one of the fire alarm system heat sensors, generating a heating beam of coherent electromagnetic radiation in the infrared spectrum, said heating beam being reflected by said reflecting means onto said one of the fire alarm heat sensors thereby triggering the fire alarm system, and transporting said first and second lasers and said reflecting means from a first position to a second position.

* * * * *